(12) United States Patent
Amanullah (10) Patent No.: US 10,513,648 B2
(45) Date of Patent: Dec. 24, 2019

(54) TECHNIQUES TO MANAGE MUD PROPERTIES

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 7 days.

(21) Appl. No.: 15/157,613

(22) Filed: May 18, 2016

(65) Prior Publication Data

US 2016/0348451 A1 Dec. 1, 2016

Related U.S. Application Data (60) Provisional application No. 62/166,948, filed on May 27, 2015.

(51) Int. Cl.
*C09K 8/06* (2006.01)

(52) U.S. Cl.
CPC ............ *C09K 8/06* (2013.01); *C09K 2208/20* (2013.01)

(58) Field of Classification Search
CPC ....................................................... C09K 8/05
See application file for complete search history.

(56) References Cited

U.S. PATENT DOCUMENTS

| | | | |
|---|---|---|---|
| 4,770,795 A | 9/1988 | Giddings et al. | |
| 5,407,879 A | 4/1995 | Kajita | |
| 5,424,284 A | 6/1995 | Patel et al. | |
| 5,789,349 A | 8/1998 | Patel | |
| 6,746,611 B2 | 6/2004 | Davidson | |
| 7,989,402 B2 | 8/2011 | Dino et al. | |
| 8,563,479 B2 | 10/2013 | Amanullah et al. | |
| 9,175,205 B2 | 11/2015 | Amanullah et al. | |
| 2002/0096366 A1* | 6/2002 | Davidson | |
| 2003/0158046 A1 | 8/2003 | Patel et al. | |
| 2009/0044617 A1* | 2/2009 | DiFoggio et al. | |

(Continued)

FOREIGN PATENT DOCUMENTS

| | | |
|---|---|---|
| WO | 99/00575 | 1/1999 |
| WO | 00/23538 | 4/2000 |
| WO | 01/09039 | 2/2001 |

OTHER PUBLICATIONS

International Search Report and Written Opinion issued in International Application No. PCT/US2016/034036 dated Aug. 31, 2016.

(Continued)

*Primary Examiner* — William D Hutton, Jr.
*Assistant Examiner* — Avi T Skaist
(74) *Attorney, Agent, or Firm* — Fish & Richardson P.C.

(57) ABSTRACT

Methods and systems for maintaining stability of contaminated drilling muds within a desirable range by chemical and/or physical treatment. In one aspect, a method includes injecting a drilling mud in a subterranean zone, the drilling mud including a quantity of a first drilling mud additive including a volcanic ash, determining a presence of a gas associated to a process of the subterranean zone, and neutralizing the gas by injecting a quantity of a second drilling mud additive through the subterranean zone, the second drilling mud additive including a gas neutralizer.

22 Claims, 3 Drawing Sheets

(56) References Cited

U.S. PATENT DOCUMENTS

| | | | |
|---|---|---|---|
| 2011/0009299 A1* | 1/2011 | van Zanten | C09K 8/36 507/129 |
| 2012/0108471 A1 | 5/2012 | Amanullah et al. | |
| 2013/0324443 A1 | 12/2013 | Wang et al. | |
| 2014/0005079 A1 | 1/2014 | Dahanayake et al. | |
| 2014/0353043 A1 | 12/2014 | Amanullah et al. | |

OTHER PUBLICATIONS

Gulf Cooperation Council Examination Report issued in GCC Application No. GC 2016-31387 dated Jun. 28, 2018, 4 pages.
Gulf Cooperation Council Examination Report issued in GCC Application No. GC 2016-31387 dated Mar. 5, 2019, 4 pages.
Gulf Cooperation Council Examination Report issued in GCC Application No. GC 2016-31387 dated Oct. 4, 2018, 4 pages.
Gulf Cooperation Council Examination Report issued in GCC Application No. GC 2016-37003 , dated May 2, 2019, 4 pages.

* cited by examiner

TECHNIQUES TO MANAGE MUD PROPERTIES

TECHNICAL FIELD

This specification relates to water-based drilling mud compositions and related methods.

BACKGROUND

Millions of barrels of water-based muds are used each year to explore and exploit oil and gas resources both in the onshore and offshore drilling environments. Bentonite muds have been used as a drilling mud additive in the oil and gas, geothermal, and water well drilling industries for hole cleaning, cuttings suspension, formation support, and other drilling operations. Conventional chemical structure of bentonite muds is associated with serious technical limitations due to poor tolerance to monovalent and divalent salts, undesirable mud solids, cement contamination, pH changes, and temperature changes above 100 degrees Celsius. The standard mud system also has strong interactions with subsurface formations such as anhydrite, evaporite, salt diapirs, clay rich formations, reactive shale, marls, and the like. As salt cannot be used to inhibit the reactive fresh water phase of the bentonite mud, it creates serious borehole problems in drilling evaporite, anhydrite, and reactive shales that are frequently encountered in many fields. Due to the high dissolution capacity of fresh water used in bentonite mud formulations, hole enlargement and loss of circulation occur while drilling shales, evaporites, and anhydrites. The bentonite mud triggered bore hole problems can lead to the setup of an unplanned casing string with a significant increase in total well costs and may also lead to a poor cementation job requiring a remedial action for a correction. However, due to serious technical limitations of the bentonite muds, they are ineffective in drilling evaporite, anhydrite, clay rich, and salty formations in many fields.

SUMMARY

This specification describes systems and methods to maintain properties of contaminated drilling muds within a desirable range by chemical and/or physical treatment. In some examples, a method includes injecting a drilling mud in a subterranean zone, the drilling mud including a quantity of a first drilling mud additive including a volcanic ash, determining a presence of a gas associated to a process of the subterranean zone, and neutralizing the gas by injecting a quantity of a second drilling mud additive through the subterranean zone, the second drilling mud additive including a gas neutralizer.

In some implementations, the first drilling mud additive further includes water, a viscosifier and a pH buffer. Determining the presence of the gas can include detecting a concentration of the gas. The concentration of the gas can further include attaching a gas sampling probe to the subterranean zone and measuring the concentration of the gas with the gas sampling probe. The gas sampling probe can include a surface monitoring system.

In some implementations, determining the presence of the gas can include comparing the concentration of the gas to a concentration threshold. The concentration threshold can be about 10 parts-per million (ppm). The method can further include measuring a set of filtration properties, rheological properties and gel strength properties of the drilling mud mixed with the first drilling mud additive and the second drilling mud additive.

The quantity of the volcanic ash in the drilling mud can be in a range of about 5 wt. % to about 8 wt. % of the drilling mud. The quantity of the water can be in an amount greater than 90 wt. %. The quantity of the viscosifier can be in a range of about 0.3 wt. % to about 0.8 wt. % of the drilling mud. The quantity of the bi-functional mud additive can be in a range of about 0.5% (w/w) to about 1% (w/w) of the water-based drilling mud. The drilling mud excludes cristobalite. The volcanic ash presents a D50 value of about 40 micrometers. The volcanic ash can include silica, aluminum oxide, calcium hydroxide, ferric oxide, and magnesium oxide.

In some implementations, the water can include at least one of fresh water, sea water, salt water, or formation brine. The drilling mud additive has a particle size distribution of less than about 100 micrometers. The drilling mud additive can include at least one of psyllium husk, hydroxypropylated starch, aribonose, or xylose. The drilling mud additive has a viscosity that ranges from about 8 cP to about 30 cP.

The present disclosure also provides another method that includes actions of adding a drilling mud additive to a drilling mud, the drilling mud additive including a quantity of volcanic ash and a gas neutralizer, neutralizing an effect of gases released from a subterranean formation in response to drilling a wellbore through the subterranean formation by flowing the drilling mud including the drilling mud additive through the subterranean formation while drilling the wellbore.

In some implementations, the drilling mud additive further includes at least one of water, a viscosifier and a pH buffer. The quantity of the volcanic ash in the drilling mud can be in a range of about 5 wt. % to about 8 wt. % of the drilling mud. The quantity of the water can be in an amount greater than 90 wt. %. The quantity of the viscosifier can be in a range of about 0.3 wt. % to about 0.8 wt. % of the drilling mud. The quantity of the bi-functional mud additive can be in a range of about 0.5% (w/w) to about 1% (w/w) of the drilling mud. The drilling mud excludes cristobalite. The volcanic ash can present a D50 value of 40 micrometers. The volcanic ash can include silica, aluminum oxide, calcium hydroxide, ferric oxide, and magnesium oxide.

In some implementations, the water can be fresh water, sea water, salt water, formation brine, or combinations thereof. The drilling mud additive has a particle size distribution of less than about 100 micrometers. The drilling mud additive can include psyllium husk, hydroxypropylated starch, aribonose, xylose, or combinations thereof. The drilling mud additive has a viscosity that ranges from 8 cP to 30 cP.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification relates to maintenance of properties of contaminated drilling muds within a desirable range by chemical and/or physical treatment. Drilling mud compositions and related methods are provided as implementations of the present implementation. The drilling mud compositions contain volcanic ash and provide improved properties relative to tolerance of high salt content, cement, lime, and high temperatures.

Wellbore formation in subterranean zones involves drilling the subterranean zone, for example, using a drilling rig. Drilling mud is injected into and flowed through the wellbore being drilled. The drilling mud serves several purposes some of which are described below. Sometimes, harmful gases trapped in subterranean zones can be released in response to drilling. Such gases can be neutralized by adding certain drilling additives (sometimes called gas neutralizers or oxygen scavengers) to the drilling mud. Those gas neutralizers, however, can negatively affect a performance of the drilling mud. This disclosure describes a drilling additive that can be added to the drilling mud together with the gas neutralizers that decreases or eliminates the negative effect of the gas neutralizers on the drilling mud without affecting an ability of the gas neutralizers to neutralize the harmful gases released from the subterranean zone.

Particular implementations of the subject matter described in this specification can be implemented so as to realize one or more of the following advantages. The presented implementations provide an Occupational Health, Safety and Environment (OHSE) and ecofriendly mud drill additive, which is absent of carcinogenic substances (for example, cristobalite). The drill mud presents a relatively simple formulation that is easy to maintain and free to dispose in the vicinity of a rig operation. As another advantage of the present implementation, the proposed mud composition allows incorporating potassium chloride and other type of inhibitors in the mud system without causing any changes to the mud properties to provide inhibition to reactive shale, clays, marls and other water sensitive formations. The mud composition also has a relatively high tolerance to mud solids to prevent any major changes of the rheological and filtration properties of the mud. The mud composition additionally has a relatively high tolerance to monovalent and divalent salts to prevent any major changes of the rheological, gel strength, filtration, and mudcake building properties to the mud composition. The mud is tolerant to salt concentrations ranging from 5 to 25 pounds per barrel of mud and also to the saturation lever of monovalent salts (for example, NaCl or KCl) and divalent salts (for example, $CaCl_2$). In some implementations, mud is tolerant to any salt concentration up to the saturation level. Additional advantages are that the mud composition of the present implementation has a relatively high tolerance to cement contamination to prevent any major changes of the rheological, gel strength, filtration and mudcake building properties to the mud composition. Implementations of the mud composition have a relatively high thermal stability (up to 100 degrees Celsius) to prevent any major changes of the rheological, gel strength, filtration and mudcake building properties to the mud system. Implementations of the mud composition have low American Petroleum Institute (API) and high temperature/high pressure (HTHP) fluid loss and allow the deposition of a well dispersed and thin mudcake on the borehole wall to reduce the scope of differential sticking in highly permeable formations. The smaller particle size and higher surface area and the changes in the inter-particle physical and mechanical interactions makes the water-based drilling mud tolerant to simultaneous contamination of two or more different contaminants, such as multiple types of drill solids, green cement and set cement. The use of the drilling mud additive can reduce the total drilling cost by reducing the mud treatment and mud management cost along with the reduction of mud related drilling problems and associated nonproductive time cost. Due to the absence of cristobalite in the volcanic ash additive, the system is OHSE friendly. The natural and organic additives used in the formulation are ecofriendly. Hence, the mud system is environmental friendly. The high tolerance to salt of the drilling mud additive, up to the saturation level, of the drilling mud makes the drilling mud additive highly suitable for salt formation drilling.

Figure 1:
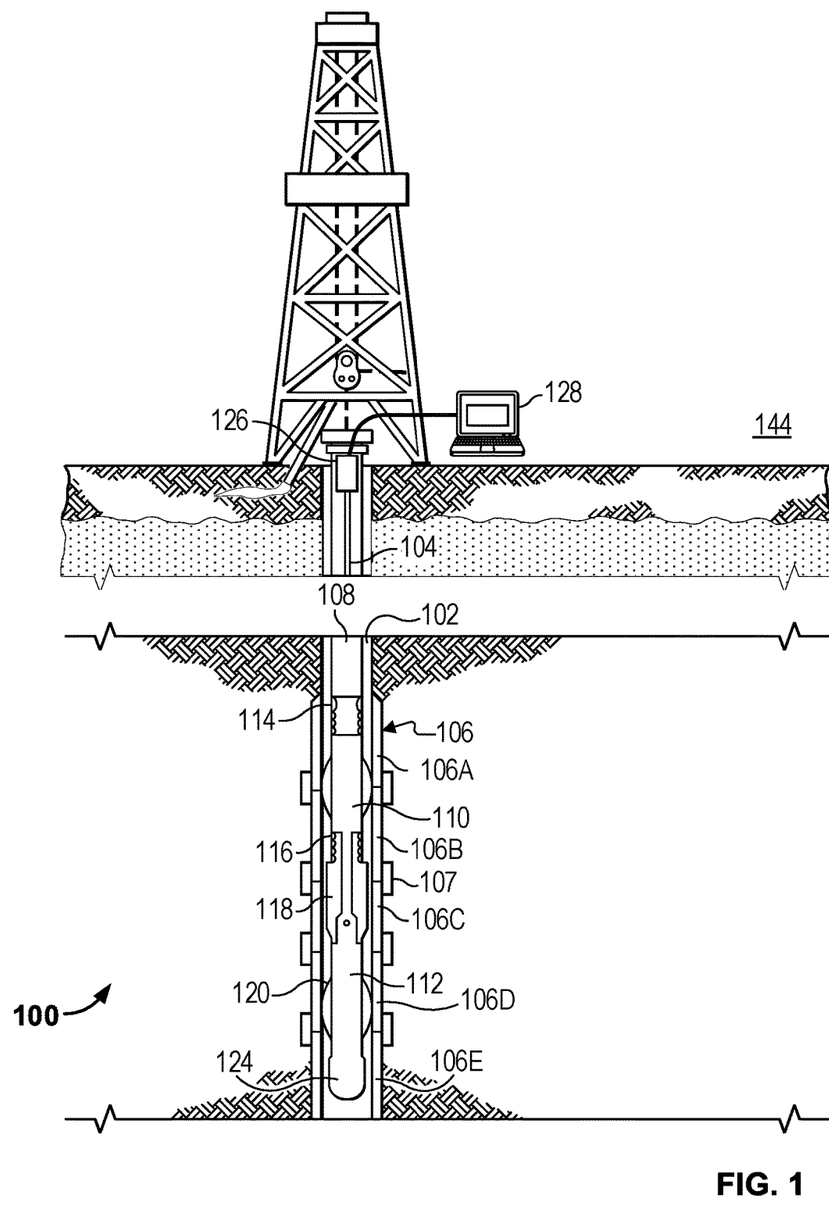
FIG. 1 illustrates an example well system for drilling a well in a subterranean formation.

FIG. 1 is a diagram of an example well system 100 for maintaining the properties of contaminated drilling muds in a subterranean formation 101. The illustrated example system 100 includes one or more components of a drilling operation. Generally, for example, a cementing operation may seal (for example, permanently) annular spaces between a casing and walls of a wellbore. Cement may also seal formations to prevent loss of drilling fluid and for operations ranging from setting kick-off plugs for guiding a change of direction for the drill bit to plug-to-abandon for securing formation fluids in the originating strata and sealing off selected intervals of a well.

The example well system 100 includes a wellbore 102 defined in a subterranean formation below a terranean surface 144 (as illustrated a bottom portion of FIG. 1 is zoomed-in relative to a top portion). The wellbore 102 can include any combination of horizontal, vertical, curved, and/or slanted sections, including a lateral wellbore, multi-laterals, or other configurations. Further, although shown on the terranean surface 144, the system 100 may be located in a sub-sea or water-based environment. For example, in some implementations, a drilling assembly used to create the wellbore 102 may be deployed on a body of water rather than the terranean surface 144. For instance, in some implementations, the terranean surface 144 may be an ocean, gulf, sea, or any other body of water under which hydrocarbon-bearing formations may be found. In short, reference to the terranean surface 144 includes both land and water surfaces and contemplates forming and/or developing one or more deviated wellbore systems 100 from either or both locations.

The wellbore 102, in this example, includes a casing 106, which may be cemented in the wellbore 102. The casing 106 includes multiple casing sections 106A, 106B, 106C, 106D, and 106E connected end-to-end by a casing collar 107. The well system 100 includes a working string 104 configured to be deployed in the wellbore 102. The working string 104, in this example, terminates above the surface 144. The working string 104 includes a tubular conduit of jointed and/or coiled tubing configured to transfer materials into and/or out of the wellbore 102. For example, the working string 104 can communicate displacement fluid 108 into or through a portion of the wellbore 102. Within the context example, which illustrates a drilling job, the displacement fluid 108, may be a drilling mud used to force a cement slurry 110 out of the working string 104 and into an annulus between the wellbore 102 and the working string 104. The working string 104 can also communicate other types of fluids, such as the cement slurry 110 and drilling fluid 112. The working string 104 can be in fluid communication with a fluid supply source. Example fluid supply sources include a pressurized tank and/or a surface compressor. In other instances, the working string 104 may be deployed in and out of the wellbore 102 via a wire (for example, wireline, slickline, e-line, or otherwise).

The working string 104 can include one or more downhole tools. Generally, the locatable downhole tool can include a location detector that can be installed in the downhole tool. The location detector can include, in some examples, a gas detector, a casing collar locator (CCL), a temperature sensor, a gamma ray detector, or a different detector compatible with the well system 100. The locatable downhole tool can further include devices to measure other properties such as temperature, pressure, pH, salinity of the fluid inside the casing. Examples of locatable downhole tools in the example working string 104 can include a top plug 114, a bottom plug 116, a float collar 118, a centralizer 120, a guide shoe 124, and other downhole tools. The locatable downhole tool can be coupled to a receiver 126, to transmit and/or transfer (for example, at the surface 144) a signal generated by the location detector.

In some implementations, the locatable downhole tool can automatically generate a surface detectable signal in the working string 104 each time the casing collar locator moves through a pipe casing collar. The depth of locatable downhole tool can be measured (for example, continuously or at particular intervals) by the surface receiver 126. The measured depth of the locatable downhole tool corresponds to the detected signal that is recorded to produce an accurate record of the depth of each detected casing collar.

The receiver 126 can be a pressure transducer, an accelerometer, a geophone, or any other type of receiver compatible with the well system 100. The receiver 126 can be coupled to a control system 128, to process (for example, at the surface 144) the signal generated by the location detector. The control system 128 are configured to process the signal generated by the location detector and to perform particular actions to control the flow of a fluid through casing, based on the determined location of the locatable downhole tools. In instances where the locatable downhole tool is the top plug 114, the control system 128 can be used to control the composition and the volumetric flow of the displacement fluid 108.

The displacement fluid 108 can include any appropriate fluid or fluid composition. For example, the displacement fluid 108 can be a water-based drilling mud composition with improved properties relative to tolerance of high salt content, cement, lime, and high temperatures. Within the context example, the drilling mud can include an acid solution, phenol disulfonic acid (PDA), a dissolvent (for example, water, slurry, brine, oil, or any suitable combination) and a drilling mud additive.

In some implementations, the drilling mud additive can include volcanic ash, water, a viscosifier, a pH buffer, and a bi-functional mud additive. The volcanic ash includes silica, aluminum oxide, lime, ferric oxide, and magnesium oxide. The viscosifier can be present in an amount sufficient to provide sufficient viscous properties for the composition. The pH buffer can be present in an amount sufficient to maintain a pH of the composition in a predetermined pH range. A bi-function mud additive is an additive that performs two functions at the same time. The bi-functional additive used in the present implementation acts as a viscosity enhancer, such as a secondary viscosifier, and also as a fluid loss additive. The bi-functional mud additive is chemically non-reactive with the volcanic ash.

The amounts of the components contained within the drilling fluid or mud can vary. For example, the volcanic ash can be present in a range of about 5 weight percent (wt. %) to about 8 wt. % of the composition. The term "about" indicates an approximation of the associated value with a few percentages, such that about 5 wt. % can vary by plus or minus 5% or 10%. In an implementation, the percentage of volcanic ash that can be used is about 5.35%. The water can be present in an amount greater than about 90 wt. % of the composition. In some implementations, the percentage of water that can be used in mud composition formulations is 93.6 wt. %. The viscosifier can be present in a range of about 0.3 wt. % to about 0.8 wt. %. In some implementations, the viscosifier can be present in an amount of about 0.535 wt. %, particularly when the viscosifier includes *Xanthomonas campestris* (XC) polymer. The bi-functional mud additive can be present in a range of about 0.5 mass fraction (% (w/w)) to about 1% (w/w) of the composition.

The components and amounts of each component contained in the volcanic ash can vary, particularly depending upon the source of the volcanic ash. An example of volcanic ash can include silica, aluminum oxide, lime (calcium oxide), ferric oxide, and magnesium oxide. In some implementations, the volcanic ash can include about 45.7 wt. % silica, about 15 wt. % aluminum hydroxide, about 9 wt. % lime, about 12 wt. % ferric oxide, and about 8 wt. % magnesium oxide. The volcanic ash composition can be absent of cristobalite.

The volcanic ash can include particles within a particular size range that can be manufactured by using any commercial grinder having a programmable predefined particle size distribution profile. In some implementations, the volcanic ash has an average particle size distribution that ranges from about 20 micrometers to about 60 micrometers, with a predominant D50 value of 40 micrometers (the D50 value denoting the diameter where half of the particle population is below this value). Formulation of the mud compositions of the present implementation can be prepared at room temperature using cold water. In some implementations, the ingredients can be mixed at a temperature range around the room temperature to produce a viable mud formulation, without requiring heating.

The drilling fluids of the present implementation are water-based. The source of the water used to make the drilling fluid compositions of the present implementation can vary. For example, the water can be fresh water, sea water, salt water, formation brine, or combinations thereof. Other suitable sources of water can be apparent to those of skill in the art and are to be considered within the scope of the present implementation.

The properties of the bi-functional mud additive can vary, depending upon the application in which the drilling mud is being used. In some implementations, the particle size can be important. In some implementations, the bi-functional mud additive has a particle size distribution of less than about 100 micrometers. In some implementations, it is desirable for the bi-functional mud additive to be chemically non-reactive with the volcanic ash. In other applications, it is desirable for the bi-functional mud additive to be capable of physically binding to the volcanic ash.

Various types of compounds can be used as the bi-functional or bifurcation mud additive. For example, the bi-functional mud additive can include psyllium husk, hydroxyprophylated starch, aribonose, xylose, or combinations thereof. Other suitable compounds that can be used as the bi-functional mud additive can be apparent to those of skill in the art and are to be considered within the scope of the present implementation.

In some implementations, when the bi-functional additive includes psyllium husk, the psyllium husk can be present in an amount that ranges from about 0.5 wt. % to about 1 wt. %. In some implementations, the psyllium husk can be present in an amount of about 0.535 wt. %. The psyllium husk can be present in an amount that is effective to enhance the viscous properties of the mud composition and for controlling the fluid loss behavior of the mud composition. The psyllium husk can be used to enhance the rheological properties of the mud compositions along with the filtration control behavior of the mud compositions of the present implementation.

Various types of compounds can be used as the viscosifier in implementations of the present implementation. For example, the viscosifier can include XC polymer, a water-swellable viscosifier, polyacrylamide, polyanionic cellulose, or combinations thereof. In some implementations, the viscosifier can include XC polymer as the single functional viscosifier for generating desirable viscous properties in the mud system. In some implementations, when the single functional viscosifier is the XC polymer, the viscosifier can be used to generate the required rheological and gelling properties in the mud compositions. In some implementations, the viscosifier can be a water-swellable viscosifier.

In some implementations, the viscosity of the composition is maintained within a predetermined range. For example, the viscosifier can maintain a viscosity of the composition in a range of about 8 centipoise (cP) to about 30 cP. In some implementations, it is desirable to maintain the pH of the composition within a predetermined range to prevent the development of reactive shale, clays, marles, and other water sensitive formations. For example, the pH buffer can maintain a pH of the composition that ranges from about 9 to about 10.5; or alternatively, from about 9.5 to about 10. Various types of pH buffers can be used in the present implementation. For example, the pH buffer can include sodium hydroxide, potassium hydroxide, lime, or combinations thereof. The sodium hydroxide can be a 5 normality of sodium hydroxide. In some implementations, when the pH buffer is a 5 normality of sodium hydroxide, the alkaline material keeps the mud composition in an alkaline range to minimize the corrosive effect of the mud composition on steel tubulars, tanks, pumps, and the like. In some implementations, when the pH buffer includes sodium hydroxide, the sodium hydroxide can be present in an amount that ranges from about 2 cubic centimeter to about 2.5 cubic centimeter; or alternatively, about 2 cubic centimeter. For example, the sodium hydroxide can be present in an amount effective to maintain a pH range of about 9.5 to about 10 for the mud composition.

The drilling mud mixed with drilling mud additives (mud composition) of the present implementation have a high tolerance to multiple contaminants and/or conditions. For example, the mud composition of the present implementation remains stable for a wide range of pH values with negligible or no changes in the rheological, filtration, and mudcake building properties. In some implementations, the pH values can range between about 7 to about 12 with no major changes in the rheological or filtration behavior of the mud compositions.

In some implementations, the mud composition remains stable for a wide range of solids content with negligible or no changes in the rheological, filtration, and mudcake building properties. For example, the content of solids can range between about 1 part per billion (ppb) to about 25 ppb with no major changes in the rheological or filtration behavior of the mud compositions. In some implementations, the mud composition remains stable for a wide range of monovalent salt contamination with negligible or no changes in the rheological, filtration, and mudcake building properties. In some implementations, the monovalent salt content can range between about 0 ppb to about 25 ppb with no major changes in the rheological or filtration behavior of the mud compositions. In some implementations, the mud composition remains stable for a wide range of divalent salt contamination with negligible or no changes in the rheological, filtration, and mudcake building properties. In some implementations, the divalent salt content can range between about 1 ppb to about 25 ppb with no major changes in the rheological or filtration behavior of the mud compositions. In some implementations, the mud composition remains stable for a wide range of cement contamination with negligible or no changes in the rheological, filtration, and mudcake building properties. In some implementations, the cement content can range between about 0 ppb to about 30 ppb with no major changes in the rheological or filtration behavior of the mud compositions.

In some implementations, the mud composition remains stable for a wide range of temperatures with negligible or no changes in the rheological, filtration, and mudcake building properties. In some implementations, the temperature can range between about 20° C. to about 100° C. with no major changes in the rheological or filtration behavior of the mud compositions. Besides the pH buffer, viscosifier, and the bi-functional mud additive, other types of mud additives can be used in the present implementation, such as potassium chloride as an inhibitor. Other suitable additives that can be used in the present implementation include crosslinking agents, biocides, breakers, buffers, surfactants, non-emulsifiers, stabilizers, fluid loss additives, foamers, friction reducers, and the like or combinations thereof, as needed. The concentration of the viscosifier and the bi-functional additive in the mud compositions of the present implementation can range from about 0.5% (w/w) to about 1% (w/w) of the mud system to obtain desirable rheological, filtration, and mudcake building properties.

In some implementations, the example well system 100 can be used as an adaptable mud system due to its ability to drilling salt formations, reactive shale formations, and/or unconsolidated formations with minimum borehole problems. The mud system can be converted to a gel-based lost circulation materials (LCM) by adding more than 60 ppb cement to act as a natural cross-linker to control loss of circulation while drilling.

Figure 2:
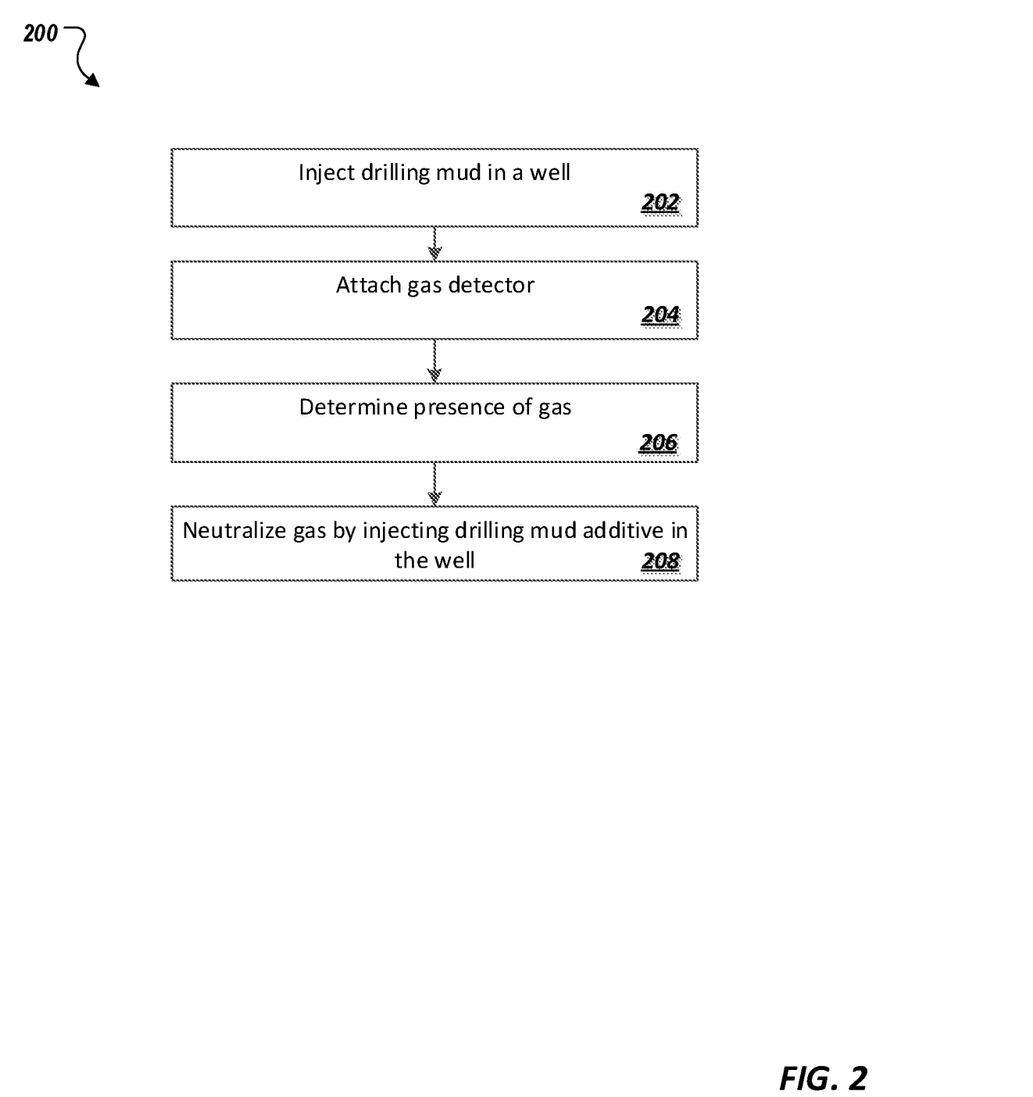
FIG. 2 is a flowchart of an example process for neutralizing gases in a subterranean formation.

FIG. 2 is a flow chart showing an example process 200 for maintenance of properties of contaminated drilling muds within a desirable range by chemical and/or physical treatment. In some instances, the process 200 is used to assist the production of fluids in a wellbore. At 202, a drilling mud is injected in a well. For example, the drilling mud can be injected using the example system 100 described with reference to FIG. 1. The composition of the drilling mud can include an acid solution, PDA, and a dissolvent (for example, water, slurry, brine, oil, or any suitable combination).

At 204, a gas detector is attached to the well. In some implementations, the gas detector can include a gas sampling probe and a surface monitoring system. For example, the presence of $H_2S$ in the well can be detected using a surface monitoring system. In some implementations, the gas detector can determine the presence of gas (for example, $CO_2$ and $O_2$) in the well based on changes in mud properties. The identification of gas presence can also include a comparison of the gas concentration to a predetermined threshold. For example, the presence of hydrogen sulfide $H_2S$ in the well can be continuously monitored until it reaches a threshold of 10 ppm before the next step of the process 200 is performed. The identification of gas presence can also be of a binary type, such that the observation of any concentration of a particular gas (for example, carbon dioxide $CO_2$ and oxygen $O_2$) higher than zero can trigger the execution of the next step of process 200.

At 206, a drilling mud additive is prepared and at least a portion of the drilling mud additive is injected in the well to maintain the stability of the drilling mud. For example, the drilling mud additive can be injected using the example system 100 described with reference to FIG. 1. The types and proportions of the various mud components used in the present implementation were selected based on several technical and environmental considerations. For example, the composition of the drilling mud additive can include volcanic ash, water, a viscosifier, a pH buffer, a bi-functional mud additive (as described with reference to FIG. 1) and additional gas neutralizers. The additional gas neutralizers can be chemicals that neutralize gases identified in step 204 (for example, iron gluconate for hydrogen sulfide $H_2S$ neutralization, calcium hydroxide $Ca(OH)2$ for $CO_2$ neutralization and/or sodium hydrosulfide NaHS for $O_2$ neutralization). To obtain the desired mud properties, a range of values of the viscosifier and the bi-functional additive were evaluated to select the most suitable value or range of values for this implementation. The amount of the viscosifiers can be varied within a narrow range in the vicinity of the optimum values described herein. The proportion of the volcanic ash in the mud compositions of the present implementation can also be varied by appropriate adjustment of other mud additives. It was found that by changing the ratio of a single functional viscosifier and the bifunctional additive from about 1:1 to about 1:2, a low or high viscosity drilling mud system can be produces to fulfill certain drilling conditions.

In some implementations, the process 200 further includes a continuous monitoring of gases in the well and further injection of the drilling mud additive (repetition of steps 204 and 206) throughout the entire drilling process. The composition of the drilling mud additive, as used for step 206 can be adapted to variations identified in measurements of the step 204, such that the determination of a change in gas presence can trigger the addition of the corresponding neutralizing chemical component to maintain desirable mud properties.

Figure 3:
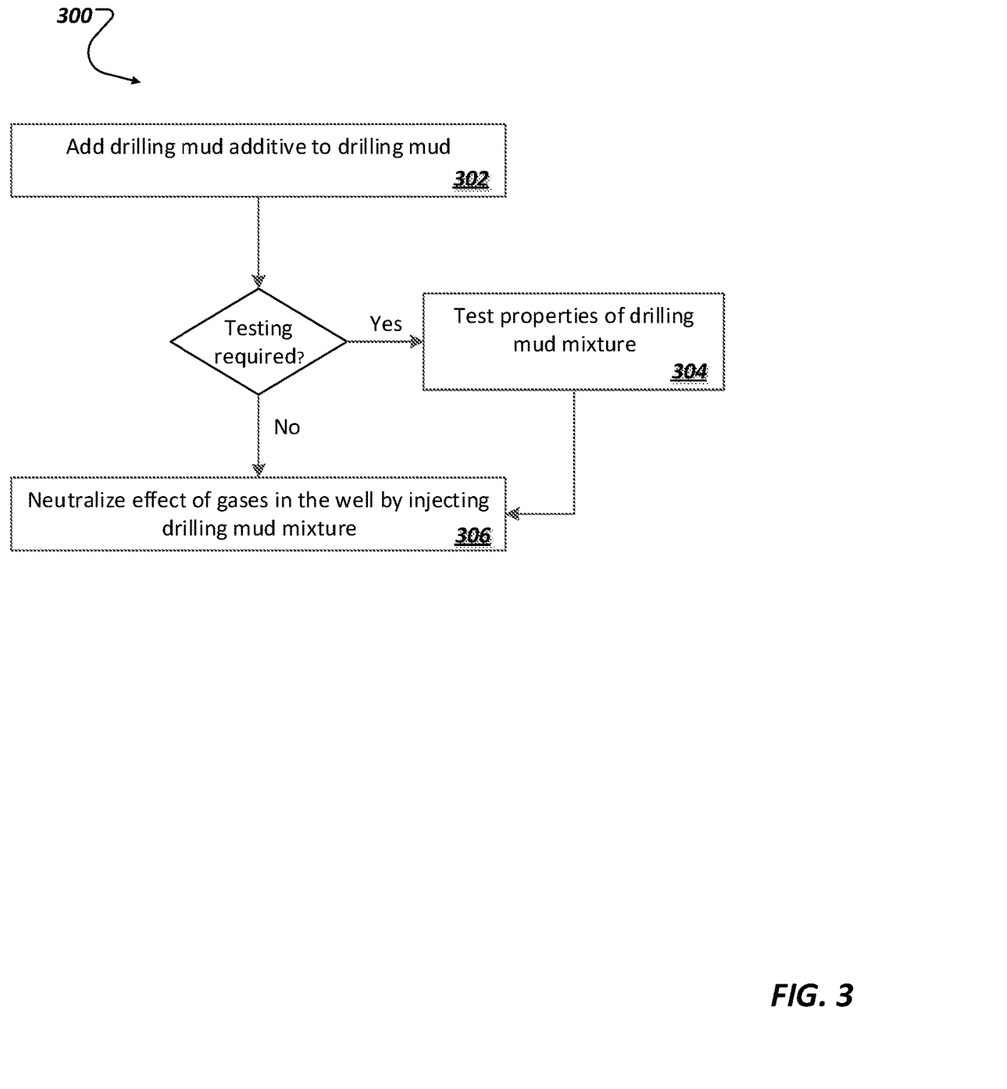
FIG. 3 is a flowchart of another example process for neutralizing gases in a subterranean formation.

FIG. 3 is a flow chart showing an example process 300 for maintenance of properties of contaminated drilling muds within a desirable range by chemical and/or physical treatment. In some implementations, the process 300 is used to assist the production of fluids in a wellbore. At 302, a drilling mud additive is added to a drilling mud to form an eco-friendly water-based drilling mud mixture. In some implementations, the micro sized volcanic ash particles, aided by the viscosifier and the bi-functional additive, are suspended substantially uniformly in the drilling mud by means of a high speed mixer such as the Hamilton Beach mixer. The combined action of the single and bi-functional additives used in this formulation allows keeping the particles suspended for a long time (more than 2 weeks) and thus enhances the long term stability of the mud compositions of the present implementation along with all other mud properties.

At 304, the eco-friendly water-based drilling mud mixture is selectively tested. For example, a first set of fluid properties relevant for drilling operations are measured. The fluid propertied can include filtration properties (for example, API fluid loss behavior), rheological properties, thixotropic properties and gel strength properties of the eco-friendly water-based drilling mud are measured. In some implementations, a portion of the eco-friendly water-based drilling mud mixture is further mixed with one or more contaminants. The contaminants can include at least one of a monovalent salt, a divalent salt, brine, hard water, drill solids, green cement, and set cement. The monovalent salts can include sodium chloride NaCl and potassium chloride KCl. The divalent salts can include calcium chloride $CaCl_2$. A second set of fluid properties relevant for drilling operations are measured can be measured. The first set of fluid properties can be compared to the second set of fluid properties. The comparison can indicate the stability of the drilling mud by indicating that the measured properties are within the optimum operating range of the drilling mud. In some implementations, other properties listed in Tables 1-4 are also tested. The formulation of the original SAVA mud is given in Table 1. The type and amount of contaminants added to evaluate the contaminant tolerant capacity of the mud are given in Table 2. The experimental results of various contaminants effect on fluid loss behavior are given in Table 3. The experimental results of various contaminants effect on rheology and gel strength properties are given in Table 4.

TABLE 1

Base Mud Composition before Contamination with Mud Contaminants

| Base Mud (SAVA) Components and Values | | Function |
|---|---|---|
| Water (milliliters) | 340 | Produce homogeneous consistency and sufficient fluidity for pumping and circulation |
| SAVA (grams) | 20 | To improve mudcake characteristics and enhance fluid loss control |
| XC Polymer (grams) | 2 | Generate optimum viscous and gel strength properties and maintain time dependent fluid stability |
| PHP (grams) | 2 | Contribute in fluid loss control and act as a secondary viscosity enhancer |
| NaOH (milliliters) | As required to raise pH 10 | To maintain the fluid in the alkaline range |
| De-Foamer (drops) | As required | To remove air bubbles generated after mixing the components using a high speed mixer |

TABLE 2

Test Plan for Contaminant Tolerance Evaluation of the Base Mud SAVA

| NaCl Effect Evaluation | KCl Effect Evaluation | CaCl$_2$ Effect Evaluation | Cement Effect Evaluation | Solids Effect Evaluation | Lime Effect Evaluation |
|---|---|---|---|---|---|
| Base Mud Contaminated by Mixing 20 ppb NaCl | Base Mud Contaminated by Mixing 20 ppb KCl | Base Mud Contaminated by Mixing 20 ppb CaCl$_2$ | Base Mud Contaminated by Mixing 20 ppb Cement | Base Mud Contaminated by Mixing 25 ppb Rev Dust | Base Mud Contaminated by Mixing 20 ppb Lime |

TABLE 3

Evaluation of Contaminant Effect on Fluid Loss Behavior

| Mud Systems | Spurt Loss (cubic centimeter) | API Fluid (cubic centimeter) | Mudcake (millimeter) |
|---|---|---|---|
| SAVA | 0 | 8.5 | 1.2 |
| SAVA + NaCl | 0 | 8 | 0.8 |
| SAVA + KCl | 0 | 8 | 0.8 |
| SAVA + CaCl$_2$ | 0 | 7.5 | 0.8 |
| SAVA + Cement | 0 | 8 | 0.8 |
| SAVA + Rev Dust | 0 | 8 | 2 |

TABLE 4

Evaluation of Contaminant Effect on Rheology and Gel Strength Behavior

| Mud Systems | Plastic Viscosity (centipoise) | Yield Point pounds/100 square feet | 10 Second Gel Strength pounds/100 square feet | 10 Minute Gel Strength pounds/100 square feet |
|---|---|---|---|---|
| SAVA | 12 | 43 | 23 | 27 |
| SAVA + NaCl | 17 | 52 | 26 | 33 |
| SAVA + KCl | 16 | 50 | 24 | 30 |
| SAVA + CaCl2 | 20 | 49 | 27 | 35 |
| SAVA + Cement | 11 | 53 | 28 | 35 |
| SAVA + Rev Dust | 11 | 47 | 24 | 27 |

At 306, an eco-friendly water-based drilling mud with properties that are within the optimum operating range of the drilling mud mixture is injected in a well to neutralize the effects of gases. In some implementations, the injection of the drilling mud mixture additionally neutralizes one or more other contaminants, such as monovalent and bivalent salts, as illustrated in Tables 1-4.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method of treating a drilling mud, the method comprising:
   measuring one or more properties of a first mixture of an amount of the drilling mud, an amount of a first drilling mud additive, and an amount of a second drilling mud additive;
   adding one or more contaminants to the first mixture;
   re-measuring the one or more properties of the first mixture to determine that the one or more properties of the first mixture remain respectively within one or more operating ranges after adding the one or more contaminants to the first mixture;
   based on determining that the one or more properties of the first mixture remain within the one or more operating ranges, injecting another amount of the drilling mud mixed with a first amount of the first drilling mud additive into a subterranean zone, the first drilling mud additive comprising a volcanic ash and one or more additional substances;
   detecting a presence of gases in the subterranean zone that have been released from the subterranean zone, wherein the gases comprise hydrogen sulfide ($H_2S$) gas, carbon dioxide ($CO_2$) gas, and oxygen ($O_2$) gas; and
   injecting a second amount of the second drilling mud additive into the other amount of the drilling mud and the first amount of the first drilling mud additive, wherein the second drilling mud additive comprises chemicals that are reactive with the gases to reduce amounts of the gases in the subterranean zone such that the chemicals neutralize effects of the gases in the subterranean zone, while maintaining the one or more properties of a second mixture of the other amount of the drilling mud and the first and second amounts of the first and second drilling mud additives respectively within the one or more operating ranges based on the first amount of the first drilling mud additive and the second amount of the second drilling mud additive,
   wherein the chemicals comprise iron gluconate for neutralizing the hydrogen sulfide ($H_2S$) gas, calcium hydroxide ($Ca(OH)_2$) for neutralizing the carbon dioxide ($CO_2$) gas, and sodium hydrosulfide (NaHS) for neutralizing the oxygen ($O_2$) gas, and
   wherein the one or more additional substances and the volcanic ash together maintain the one or more properties of the second mixture respectively within the one or more operating ranges in the presence of the chemicals for neutralizing the gases.

2. The method of claim 1, wherein the one or more additional substances comprise water, a viscosifier, and a pH buffer.

3. The method of claim 1, wherein detecting the presence of the gases comprises determining concentrations of the gases.

4. The method of claim 3, wherein determining the concentrations of the gases further comprises:
   attaching a gas sampling probe to the subterranean zone; and
   measuring the concentrations of the gases with the gas sampling probe.

5. The method of claim 4, wherein the gas sampling probe comprises a surface monitoring system.

6. The method of claim 3, wherein detecting the presence of the gases comprises comparing the concentrations of the gases respectively to a concentration threshold.

7. The method of claim 6, wherein the concentration threshold is about 10 ppm.

8. The method of claim 1, wherein the one or more properties comprise one or more of a filtration property, a rheological property, and a gel strength property.

9. The method of claim 1, wherein an amount of the volcanic ash in the second mixture is in a range of about 5 wt. % to about 8 wt. % of the drilling mud for maintaining the one or more properties of the second mixture respectively within the one or more operating ranges.

10. The method of claim 2, wherein an amount of the water is greater than 90 wt. % for maintaining the one or more properties of the second mixture respectively within the one or more desired ranges.

11. The method of claim 2, wherein an amount of the viscosifier is in a range of about 0.3 wt. % to about 0.8 wt. % of the second mixture for maintaining the one or more properties of the second mixture respectively within the one or more desired ranges.

12. The method of claim 2, wherein the one or more substances further comprise a bi-functional mud additive in a range of about 0.5% (w/w) to about 1% (w/w) of the second mixture for maintaining the one or more properties of the second mixture respectively within the one or more desired ranges.

13. The method of claim 1, wherein the drilling mud excludes cristobalite.

14. The method of claim 1, wherein the volcanic ash predominantly presents a D50 value of about 40 micrometers.

15. The method of claim 1, wherein the volcanic ash comprises silica, aluminum oxide, calcium hydroxide, ferric oxide, and magnesium oxide.

16. The method of claim 2, wherein the water comprises at least one of fresh water, sea water, salt water, or formation brine.

17. The method of claim 1, wherein the first drilling mud additive has a particle size distribution of less than about 100 micrometers.

18. The method of claim 12, wherein the bi-functional mud additive comprises at least one of psyllium husk, hydroxypropylated starch, aribonose, and xylose.

19. The method of claim 2, wherein the one or more properties comprise a viscosity and a pH, and wherein the one or more desired ranges are respectively about 8 cP to about 30 cP and about 9 to about 10.5.

20. A method of treating a drilling mud, the method comprising:
adding first and second drilling mud additives to the drilling mud to form a mixture, the first drilling mud additive comprising a volcanic ash and one or more additional substances, and the second drilling mud additive comprising chemicals that are reactive with gases that have been released from a subterranean formation to reduce amounts of the gases in the subterranean formation such that the chemicals neutralize effects of the gases, wherein the chemicals comprise iron gluconate for neutralizing hydrogen sulfide ($H_2S$) gas, calcium hydroxide ($Ca(OH)_2$) for neutralizing carbon dioxide ($CO_2$) gas, and sodium hydrosulfide (NaHS) for neutralizing oxygen ($O_2$) gas;
measuring one or more properties of the mixture;
adding one or more contaminants to the mixture;
re-measuring the one or more properties of the mixture to determine that the one or more properties of the mixture remain respectively within one or more operating ranges after adding the one or more contaminants to the mixture; and
based on determining that the one or more properties of the mixture remain within the one or more operating ranges, while drilling a wellbore through the subterranean formation:
flowing the mixture through the subterranean formation to neutralize effects of the gases released from the subterranean formation, the gases comprising the hydrogen sulfide ($H_2S$) gas, the carbon dioxide ($CO_2$) gas, and the oxygen ($O_2$) gas, and
maintaining the one or more properties of the mixture respectively within one or more operating ranges based on a first amount of the first drilling mud additive and a second amount of the second drilling mud additive in the mixture, wherein the one or more additional substances and the volcanic ash together maintain the one or more properties of the mixture respectively within the one or more operating ranges in the presence of the chemicals for neutralizing the gases.

21. The method of claim 20, wherein the one or more additional substances comprise water, a viscosifier, and a pH buffer.

22. The method of claim 21, wherein the one or more properties comprise a viscosity and a pH, and wherein the one or more operating ranges are respectively about 8 cP to about 30 cP and about 9 to about 10.5.

* * * * *

UNITED STATES PATENT AND TRADEMARK OFFICE
CERTIFICATE OF CORRECTION

PATENT NO. : 10,513,648 B2
APPLICATION NO. : 15/157613
DATED : December 24, 2019
INVENTOR(S) : Md Amanullah It is certified that error appears in the above-identified patent and that said Letters Patent is hereby corrected as shown below:

In the Claims

Column 13, Line 48, Claim 18, delete "aribonose," and insert -- arabinose, --.

Signed and Sealed this
Fourteenth Day of April, 2020

Andrei Iancu
*Director of the United States Patent and Trademark Office*